March 22, 1960     R. ADELL     2,929,656

ORNAMENTAL AND PROTECTIVE MOLDING FOR AUTOMOBILE DOORS

Filed Oct. 27, 1958

INVENTOR.
ROBERT ADELL

ATTORNEY

United States Patent Office 2,929,656
Patented Mar. 22, 1960

2,929,656

ORNAMENTAL AND PROTECTIVE MOLDING FOR AUTOMOBILE DOORS

Robert Adell, Detroit, Mich., assignor to Franklin Z. Adell and Marvin M. Adell, both of Detroit, Mich.

Application October 27, 1958, Serial No. 769,603

3 Claims. (Cl. 296—44)

This invention relates to motor vehicles, and more particularly to an improved ornamental and protective molding for the swinging or trailing edges of the doors thereof.

Provision of ornamental and protective molding on the trailing edge of doors has now been recognized as an expedient having important advantages. However, providing such molding on the trailing edges of some constructions of automobile doors with assurance that such molding will stay in place thereon and will not fall off after a short period of use, particularly because of hard slamming of doors, presents serious difficulties.

Yearly changes of automobile models, usually including changes in styling of the body, have greatly contributed to this problem by changing designs of the doors, not only with respect to the configuration of their trailing edge but also in the construction of such edge. The above problem has been greatly enhanced still further by a condition which developed in the automobile industry whereby changes in the construction of automobile doors have been made exceedingly easy for an automobile designer. This condition is particularly prevalent with manufacturers making several models of automobiles in various price ranges.

One of the most serious items of expense in the yearly model change-overs is found in designing and making of body dies. Furthermore, a very substantial part of these expenses is in making stamping dies for doors. As a result, the automobile industry on my recommendation has developed a method to reduce this item of expense. This expedient is found in the use of identical doors, particularly the front doors, in some or even all models of a manufacturer irrespective of the price of the automobile for which such doors are intended. However, in order to impart some feature of distinctiveness or of different appearance to some of the models, a method has been devised to change the appearance of their doors and adjoining portions of the body without affecting, but, on the contrary, utilizing, their basic construction and, therefore, permitting the use of the basic dies. This is done by the use of the so-called "appliques." The applique is a hollow stamped piece having a certain configuration and adapted to be attached to the basic outside sheet of the automobile body, both in the doors and the adjoining portions thereof. Such applique usually begins in the door from the outside sheet thereof and extends rearwardly until it reaches the trailing edge of the door where it terminates abruptly and is provided with a turned-in flange closing at the trailing edge of the door what otherwise would be a large and unsightly hole. However, the configuration of the applique and its curved surface usually continues in the portion of the body adjacent to the door to provide an appearance of a continuous styling element. The end of such a continuing applique adjacent to the trailing edge of the door is also similarly provided with a flange closing the open end thereof. By use of such apliques, which are very simple and easy to apply, material variations in the outside appearance of the motor vehicle may be attained with the aid of making only much smaller and relatively inexpensive dies.

While use of such appliques has solved a number of important problems for an automobile manufacturer, it has introduced a very difficult problem in designing door edge ornamental and protective moldings. In the first place, an applique is usually the most outwardly protruding portion on the automobile body and its doors. Therefore, it is the very portion that is hit first by the doors of other automobiles adjacently parked, as well as the first to hit other automobiles, garage walls, etc. Furthermore, while the basic door usually has its trailing edge in the form of a thin lip which can be embraced by a molding of U-shaped cross section and thus be reliably retained at such edge, the applique edge is square and does not present similar possibilities for securing the edge molding.

It has been proposed to use a door edge molding which is of the U cross section in its portion intended to engage the door edge of the lip type, and of the angular cross section, such as that disclosed in my copending application Serial No. 688,717, filed October 7, 1957 for Ornamental and Protective Molding for Automobile Door Edges, in its portion intended to cover the square edge of the applique. A molding of that nature, if actually produced and installed, may perform its function properly. Manufacturing it presents serious difficulties making it hardly practical. A molding having varying cross section throughout its length cannot be produced by bending machines or other similar methods, but requires provision of special dies and manufacturing each piece of molding in such special dies. It should also be remembered that different dies would have to be made for the molding of the right door and of the left door. With the rapid changes in the design of the doors produced by use of appliques, the number of the dies that would be required for making such moldings would be very considerable, and the expense of making such dies might reach a substantial portion of the expense that has been saved by the use of the appliques.

It has also been proposed to provide a door edge of the U-shaped cross section in its portions engaging the lip of the basic door but with the back wall of its U-shaped cross section being cut out where the molding goes over the square edge of the applique and thus to produce a construction somewhat similar to that disclosed in my copending application, Serial No. 706,320, filed December 3, 1957, for Ornamental and Protective Molding for Automobile Door Edges, now Patent No. 2,897,001. It has been found, however, that the length of such recessed portion is too great to ensure tight fitting of the molding over such edge without having any means connecting the molding to the square edge. Nevertheless, some kind of die apparatus is necessary to impart to that portion of the molding the necessary curvature. It has been proposed further that three or more pieces of the molding be used with one piece being applied to the door edge of the above applique, one piece at the applique and one piece below the applique. It was found, however, that provision of several short pieces of such molding also has a number of disadvantages.

One of the objects of the present invention is to provide an improved ornamental and protective molding for automobile door edges whereby the above difficulties and disadvantages are overcome and largely eliminated without introducing new problems or materially affecting the costs involved.

Another object of the invention is to provide an improved ornamental and protective molding covering all portions of the trailing edge of a door including an applique, with such molding having different cross section throughout its length, but which, nevertheless, may be produced with the use of a bending machine or other apparatus limited to producing molding of uniform cross sections.

A still further object of the present invention is to provide an improved ornamental and edge protective molding for an automobile door having applique, which molding may be reliably mounted on the door edge and is not likely to come off even in rough usage and in hard slamming of the door.

A still further object of the present invention is to provide an improved ornamental and edge protective molding for automobile doors, which can be changed in its construction in a very simple manner and thus meet frequent changes in the construction of the basic door produced by use of various appliques, with such changes in the molding being made without the necessity of making expensive special dies.

A still further object of the present invention is to provide an improved molding of the nature specified above which is simple in construction, dependable in use and is relatively inexpensive to manufacture.

Further objects and advantages of this invention will be apparent from the following description and appended claims, references being had to the accompanying drawing forming a part of this specification, wherein like reference characters designate corresponding parts in the several views.

In accordance with the invention I discard the proposed solutions of making ornamental and protective molding for trailing edges of doors made with the use of appliques, either as a single piece of molding or as a molding separated into several pieces with the end pieces of such composite molding having no connection with each other. I produce ornamental and protective molding for doors having appliques and, therefore, having edges of the lip type through some of their portions and of the square type through others on the principle of molding having uniform cross section throughout its entire length and which has its ends positively secured to each other, and yet provides for the peculiar characteristics of the lip as well as the square edge in the applique.

In accordance with the invention I provide a composite molding in which a molding of a U-shaped cross section is applied through the entire length of the trailing edge of the basic door and is pushed under the applique in installation. Thereupon, I install over the square trailing edge of the applique a separate piece of square edge molding having an angular cross section. The ends of the applique edge molding may be soldered or otherwise connected to the U-shaped molding in the intermediate portion thereof. However, in many instances, such connection may be dispensed with and the ends of the applique molding be simply fitted against the basic door molding, particularly when the square molding is positively secured to the respective edge of the door applique.

By virtue of such an expedient I use or manufacture my improved composite molding strips of two types, but with each one having uniform cross section and yet provide molding of different cross sections along the edge of the door. It should be understood that the piece of U-shaped molding which goes under the applique becomes actually inert as far as its ornamental and edge protective function is concerned. However, this portion is very important as connecting together the exposed ends of the U-shaped molding and giving it proper strength. Furthermore, the pressure of the applique on the concealed portion of the U-shaped molding operates to hold it on the door edge in a still more reliable manner, thus contributing to improvement of the basic function of the U-shaped molding. If the ends of the applique molding are secured to the U-shaped molding, the above expedient also improves the hold of the entire molding, i.e. its U-shaped and angular shape portions in place.

Figure 1:
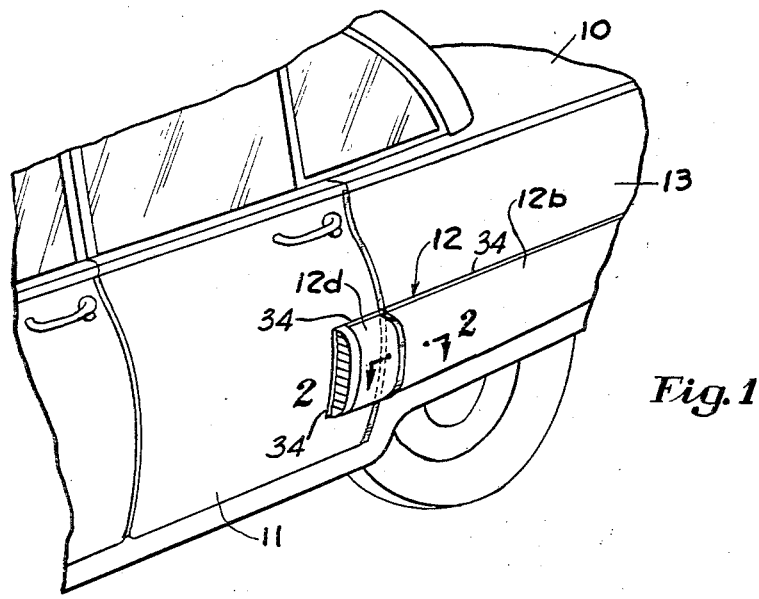
Fig. 1 is a perspective view showing a portion of a motor vehicle with the trailing edge of its rear door being provided with ornamental and edge protective molding embodying the present invention.
Figure 3:
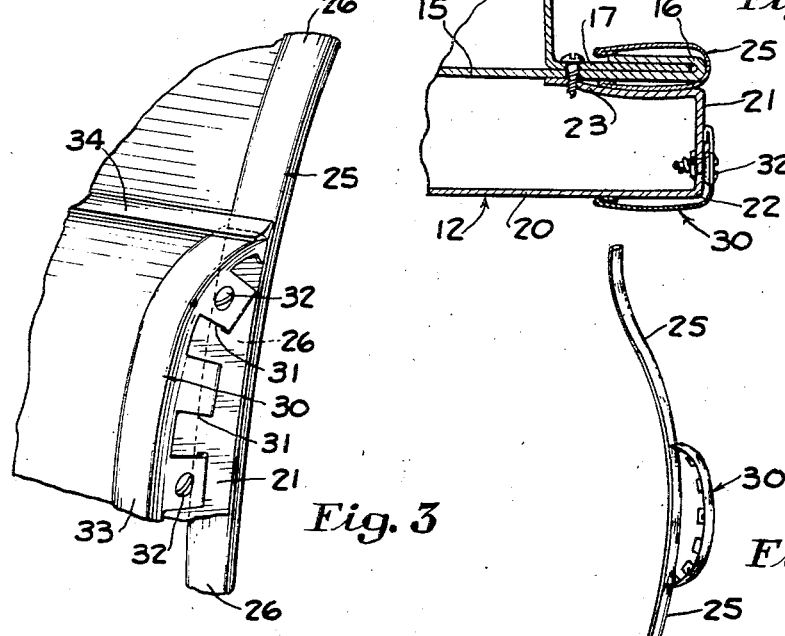
Fig. 3 is a fragmentary perspective view showing the place of juncture of the square edge of an applique and the lip edge of a basic door, with molding provided thereon.
Figure 4:
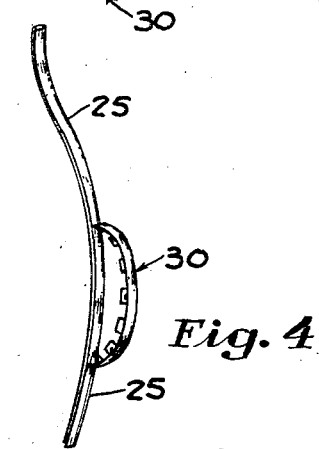
Fig. 4 is a perspective view of the composite molding shown separately, with the observer looking at the molding from the same point as in Fig. 1.

In the drawing there is shown, by way of example, a motor vehicle including an improved ornamental and edge protective molding embodying the present invention. Referring particularly to the drawing, the motor vehicle 10, a portion of which is shown in perspective in Fig. 1, includes a rear door 11 hinged at its front edge and having a back or trailing edge which swings along an arcuate path in opening and closing of the door. An applique 12 having a door portion 12d and a body portion 12b is secured to the door 11 and the side 13 of the body rearwardly of the door 11 with the aid of screws or in any other suitable way to have the surfaces of said portions 12d and 12b form continuations of each other and thus presenting an appearance of a continuous body element. As shown in Figs. 1 and 3, a fitting strip 34 is provided along the line of juncture of the applique portions 12d and 12b and the outside or skin sheets of the door 11 and of the side 13 of the body rearwardly of the door 11. The separate sections of said strip 34 register with each other as shown in Fig. 1 to provide the appearance of continuity.

The door 11 is the basic door which may be used in a number of models of motor vehicles, while the applique 12 may be a body element used in only a single model to impart to it a distinctive feature of styling peculiar to that model only.

The door 11 may be of conventional construction having an outer skin sheet 15 having its rear edge bent upon itself as shown at 16 and overlying the flange 17 of the cross sheet or inner skin sheet 18.

The applique 12 is of a hollow construction. Its door portion 12d comprises an outer skin sheet 20 having an end flange 21 forming an angular or square edge as indicated at 22 and having a peripheral inwardly directed flange 23 by which it is secured to the sheet 15 of the door. The ends of the edge 22 of the applique fall on the lip edge of the basic door 11, thus giving the appearance of a continuous trailing edge.

The construction of the motor vehicle 10 described above is similar on both sides thereof. Therefore, the construction of my improved molding described below is also similar, although the right hand and the left hand moldings are provided for the right-hand door and the left-hand door, respectively. Only the left-hand door and the left-hand molding are illustrated herein, it being understood that construction of the right-hand molding is similar.

Figure 2:
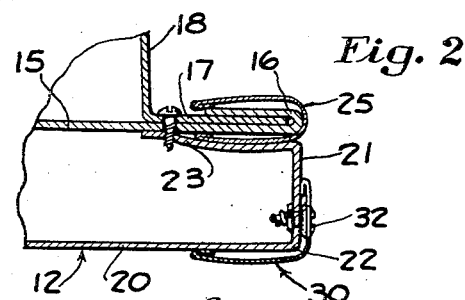
Fig. 2 is a sectional view taken in the direction of the arrows on the section plane passing through the line 2—2 of Fig. 1.

In accordance with the invention, a molding 25 having a U-shaped cross section, as is best shown in Fig. 2, and bent to longitudinal curvature corresponding to that of the lip edge of the basic door 11 is provided throughout the entire length of the lip edge of said basic door. The molding 25 is fitted under the applique portion 12d. This molding may be approximately ¼" wide and is made preferably of stainless steel. Such molding possesses resiliency and it retains itself in place by virtue thereof. However, any other methods of securing the U-shaped molding to the edge, and particularly those shown in my prior patents, may also be employed.

The portion of the outside leg 26 of the molding 25 which extends under the applique fits there tightly and may be forced between the outer sheet 15 of the door 11 and the flange 23 of the applique with the aid of a rubber mallet. Thus, this portion of the molding is held tight between the applique and the door, which improves the hold of the entire molding on the door edge.

The trailing edge 22 of the applique portion 12d has provided thereon a molding portion 30 of angular cross section with one side of the angle notched, as shown at 31, to fit over the square edge of the applique. The molding portion 30 may be secured to the applique portion 12d with the aid of screws 32. This portion of the molding may be made in accordance with the disclosure of my co-pending application, Serial No. 688,717, filed October 7, 1957, for Ornamental and Protective Molding for Automobile Door Edges.

The molding 30 has its outer angular side 33 of the same width as the outer leg of the U-shaped molding 25 and, therefore, in the closed portion of the door, the two moldings appear as a continuation of each other, giving the appearance of a single molding strip.

The ends of the molding 30 may be fitted to the surfaces of the outside leg of the molding 25 and may go under the fitting strip 34 provided along the line of juncture of the surfaces of the applique 12d and outside sheet of the door 11. If desired, such ends may also be soldered or otherwise secured to the molding 25 to provide a unitary structure.

It will now be seen in view of the foregoing that in making my composite molding I use molding strips that are of uniform cross sections. Such strips may be bent to any desired longitudinal curvature in bending machines and do not require making special dies for such bending. On the other hand, should the molding be made as a single integral strip having different cross sections throughout its length, use of special dies may be unavoidable.

The molding constructed as described above not only performs its ornamenting and protecting function but has improved strength and rigidity. The ends of the U-shaped molding which are exposed to view are connected by their intermediate portion which is under the applique and, therefore, my improved molding presents a much stronger construction than could be attained if the portion under the applique was cut out. Furthermore, said connecting portion improves the hold of the entire molding on the door edge, as mentioned. If the ends of the molding 30 are soldered or otherwise secured to the molding 25, the molding has, in effect, a truss construction. Moreover, the positive connection of the molding 30 to the flange 21 of the applique portion 12d also contributes to a more secure holding of the entire molding on the trailing edge of the door.

By virtue of the construction disclosed above the objects of the present invention listed above and a number of additional important advantages are attained.

I claim:

1. An ornamental and edge protective molding for an automobile door including a basic door structure having a continuous trailing edge and an applique structure having a trailing edge of a different cross section than the trailing edge of the basic door structure, with the fitting strip being provided along the lines of juncture of said door structure and said applique, said molding comprising a portion extending substantially throughout the entire length of the basic door structure edge and passing under the applique, and a second portion extending only over the edge of the applique and having cross section corresponding to that of the applique, with the ends of said second portion being fitted under the fitting strip to camouflage the places of juncture of said molding portions.

2. An ornamental and edge protective molding for an automobile door including a basic door structure having a continuous trailing edge of the lip type and an applique structure having a trailing edge of the square type, said molding comprising a molding portion of a U-shaped cross section having an outer leg, an inner leg, and a rounded portion connecting said legs, with said molding portion fitted over the lip edge and passing under the applique and a second molding portion having an angular cross section including an outer leg and an inner leg meeting said outer leg at a substantially 90° angle, with said second portion fitted over the square edge of the applique and having ends terminating at the places of juncture of said applique and said door structure.

3. The construction defined in claim 2, with said molding portions having their outer legs of equal width and with the ends of the second portion fitted to said first portion in order that in the closed position of the door said portions appear as a single continuous molding fitted over the trailing edge of the door, with the inner leg of said second portion being uniformly notched from its free edge toward the corner formed by the meeting legs but terminating short of reaching the same.

References Cited in the file of this patent

UNITED STATES PATENTS

| | | |
|---|---|---|
| 2,489,072 | Ausubel | Nov. 22, 1949 |
| 2,704,687 | Adell | Mar. 22, 1955 |